United States Patent [19]

Carey

[11] 4,249,597
[45] Feb. 10, 1981

[54] PLATE TYPE HEAT EXCHANGER

[75] Inventor: Van P. Carey, North Tonawanda, N.Y.

[73] Assignee: General Motors Corporation, Detroit, Mich.

[21] Appl. No.: 36,346

[22] Filed: May 7, 1979

[51] Int. Cl.³ .................. F28D 9/00; F28F 3/12
[52] U.S. Cl. ..................... 165/166; 165/70
[58] Field of Search .............. 165/70, 140, 166, 167

[56] References Cited

U.S. PATENT DOCUMENTS

| | | | |
|---|---|---|---|
| 2,610,835 | 9/1952 | Hytte | 165/167 |
| 2,617,634 | 11/1952 | Jendrassik | 165/140 |
| 2,952,444 | 9/1960 | Jenssen | 165/167 |
| 3,258,832 | 7/1966 | Gerstung | 165/176 X |
| 3,517,731 | 6/1970 | Rothman | 165/70 |
| 3,590,914 | 7/1971 | Duncan | 165/166 X |
| 3,633,661 | 1/1972 | Duncan et al. | 165/166 X |
| 4,002,201 | 1/1977 | Donaldson | 165/166 X |

FOREIGN PATENT DOCUMENTS

| | | | |
|---|---|---|---|
| 627447 | 2/1936 | Fed. Rep. of Germany | 165/166 |
| 1114083 | 4/1956 | France | 165/166 |

*Primary Examiner*—Sheldon J. Richter
*Attorney, Agent, or Firm*—R. L. Phillips

[57] ABSTRACT

A heat exchanger plate cooperable with a plate of like configuration to form a pair of manifolds and a connecting passage with the plate also cooperable with another plate of another pair of like configuration so as to nest therewith to provide an adjoining double wall between separate passages formed by adjacent arranged pairs of plates.

3 Claims, 4 Drawing Figures

PLATE TYPE HEAT EXCHANGER

This invention relates to a plate type heat exchanger and more particularly to a heat exchanger plate arrangeable with plates of like kind to form a heat exchanger having passages for two fluids separated by an adjoining pair of walls.

In plate type heat exchangers such as for solar energy systems where a double wall is desired between adjoining passages through which separate fluids are circulated, plates of different configurations are normally required to provide for their stacking to form the passages and also their nesting with each other for efficient heat transfer between the fluids. Thus, the cost of tooling is high as compared with simpler types of heat exchangers which can be formed with a single plate configuration as disclosed in U.S. Pat. No. 3,258,832 assigned to the assignee of this invention.

According to the present invention, there is provided a heat transfer plate which is arrangeable with plates of like kind to form a heat exchanger having passages for separate fluids separated by adjoining double walls. This is accomplished with a plate of uniform thickness formed with a planar portion and a pair of protuberance manifold portions which are located side-by-side and protrude equal distances in the same direction from the planar portion. The plate is further formed with a series of protuberant channel portions which are located side-by-side and protrude in the same direction as the manifold portions from the planar portion. The series of protuberant channel portions extends between the manifold portions in at least two parallel rows across the plate and the channel portion at one end of the series merges with one of the manifold portions and the channel portion at the other end of the series merges with the other manifold portion. The manifold portions and channel portions are otherwise separated from each other by the planar portion and the series of channel portions is divided into three distinct groups which extend across the rows. Two of the groups which are respectively adjacent and remote from the manifold portions have sides oriented at equal but opposite oblique angles to the rows and have the same protuberance as the manifold portions. The third group is located intermediate the other two groups and its channel portions have sides oriented at both oblique angles to the rows and have half the protuberance of the other channel portions whose protuberances are the same and less than that of the manifold portions by the thickness of one plate. Thus, two of the plates are arrangeable with their dimpled sides facing each other so that their planar portions sealingly abut and the channel portions in their first and second groups cross to interconnect while the channel portions in their third groups combine to connect the first and second groups. This forms a pair of manifolds and connecting fluid passage between the plates. More importantly, two pairs of thus arranged plates are also arrangeable with the protuberant sides of two of the plates of the two pairs facing each other so that the channel portions in their third group abut while the channel portions in their first and second groups nest alongside each other and against the planar portion on the opposite plate with their manifold portions also abuttable with those of other sealingly engaged pairs. This provides substantial surface-to-surface contact between the two pairs of plates which then provide separate fluid passages for two fluids which are separated by the two nesting or adjoining plate portions.

Preferably, only the dimpled sides of the plates are coated with a brazing material so that when the plates are stacked with adjacent pairs of plates forming the separate manifolds and passages for separate fluids, the plates may then be brazed together to seal their separate fluid passages and headers and maintain the double wall. Furthermore, the protuberant sides of the plates which nest with each other also form open channels to the exterior through which any leakage from the passages can escape thus allowing easy detection thereof. Moreover, the third group of channel portions in addition to providing for changing the flow direction between the first and second groups and allowing the dimpled sides to nest, also permit high clamping forces at the center of the heat exchanger by their abutting relationship with each other to thereby both ensure sealing during the brazing and holding of the pairs of plates in tight contact for good heat transfer therebetween.

With such plate design, it is possible to form a heat exchanger having any even number of passes in a dual loop arrangement wherein there will be provided parallel flow in each passage and counterflow overall. Furthermore, the heat transfer area in each pass is relatively small and thus the performance of the unit approximates that of a true counterflow heat exchanger with an equivalent heat transfer area.

An object of the present invention is to provide a new and improved heat exchanger plate arrangeable with plates of like kind to form a heat exchanger having passages for two fluids separated by an adjoining pair of walls.

Another object is to provide a heat exchanger plate arrangeable with plates of like kind to form a heat exchanger for separate fluids having an even number of passes with parallel flow each pass and counterflow overall.

Another object is to provide a heat exchanger plate which cooperates with a plate of like configuration to form a pair of manifolds and a connecting passage and also cooperates with another plate of another pair of like configuration so as to nest therewith to provide an adjoining double wall between separate passages formed by adjacent arranged pairs of plates.

Another object is to provide a heat exchanger plate having a pair of protuberant manifold portions and a series of protuberant channel portions protruding from one side thereof and configured and oriented relative to each other so that two of the plates are arranged with their dimpled sides facing each other to have their planar portions abut and their manifold portions and channel portions cooperate to form a pair of manifolds and connecting fluid passage between the two plates and whereby the plates are also arrangeable with their protuberant sides facing each other so that the channel portions nest to thereby provide for the formation of pairs of such plates having separate fluid passages for two fluids which are separated by two nested plates.

These and other objects of the present invention will become more apparent from the following description and drawings in which.

Figure 1:
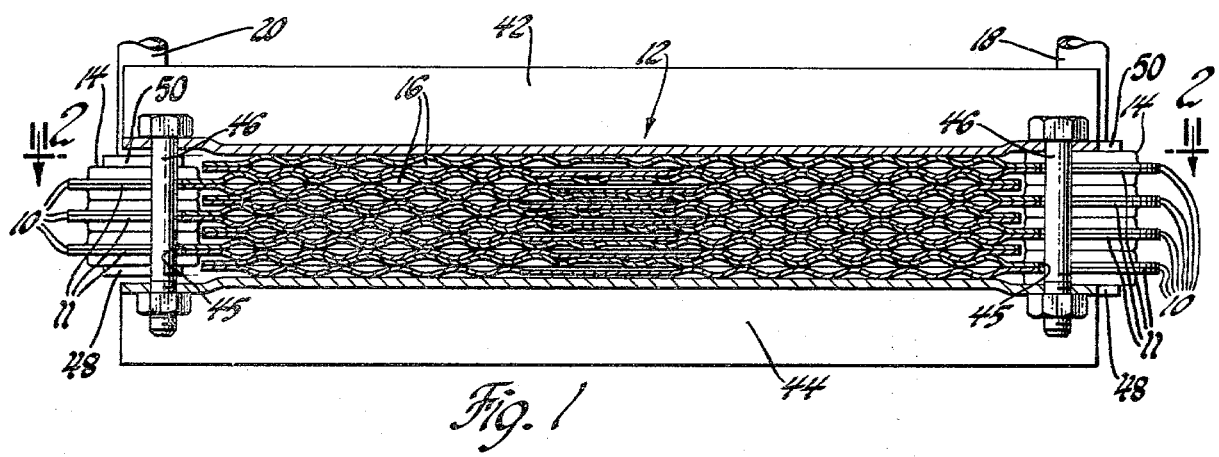
FIG. 1 is a longitudinal sectional view of a heat exchanger assembled with plates according to the present invention.

There is shown in the drawings, a plurality of identical plates 10 according to the present invention assembled in pairs 11 to form a heat exchanger 12 having layers each with a pair of manifolds 14 and a connecting passage 16 and with the manifolds of alternate layers located in banks at opposite ends of the heat exchanger and connected to receive and discharge two separate fluids through pairs of pipes 18 and 20. The adjacent passages 16 are separated by adjoining pairs of walls and the heat exchanger is thus suited for application in systems such as a solar energy system requiring a heat exchanger which will separately circulate potable water and a liquid with a low freezing point in good heat transfer relationship while providing a double wall therebetween. In such an application, the double wall is required to prevent leakage of a fluid such as ethylene glycol into the potable water and it is also desirable that any leakage from the unit should be readily detectable to so as to allow immediate repair or replacement of the heat exchanger. The present invention is well suited to such an application and for the particular purpose the single plate design 10 is configured so as to provide heat exchange with a plurality of passes of the different fluids with parallel flow each pass and counterflow overall.

Figure 2:
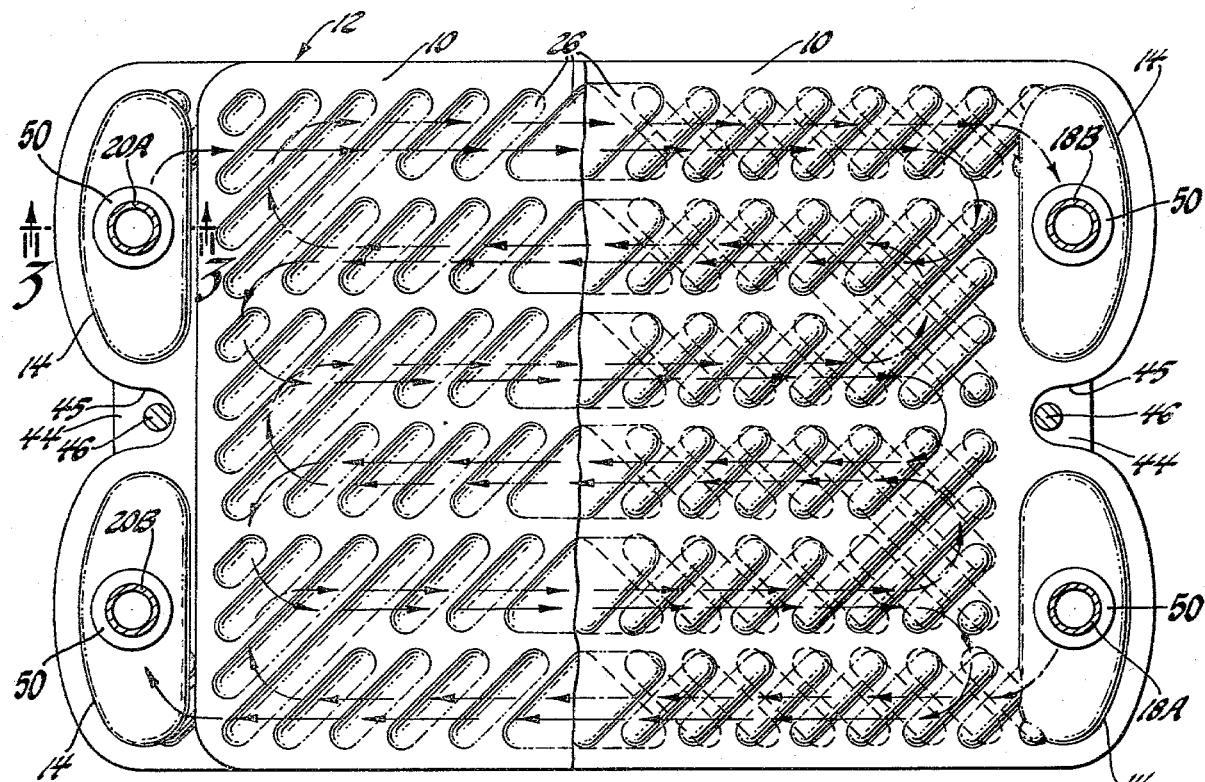
FIG. 2 is a view taken along the line 2—2 in FIG. 1 with the top plate broken away.
Figure 4:
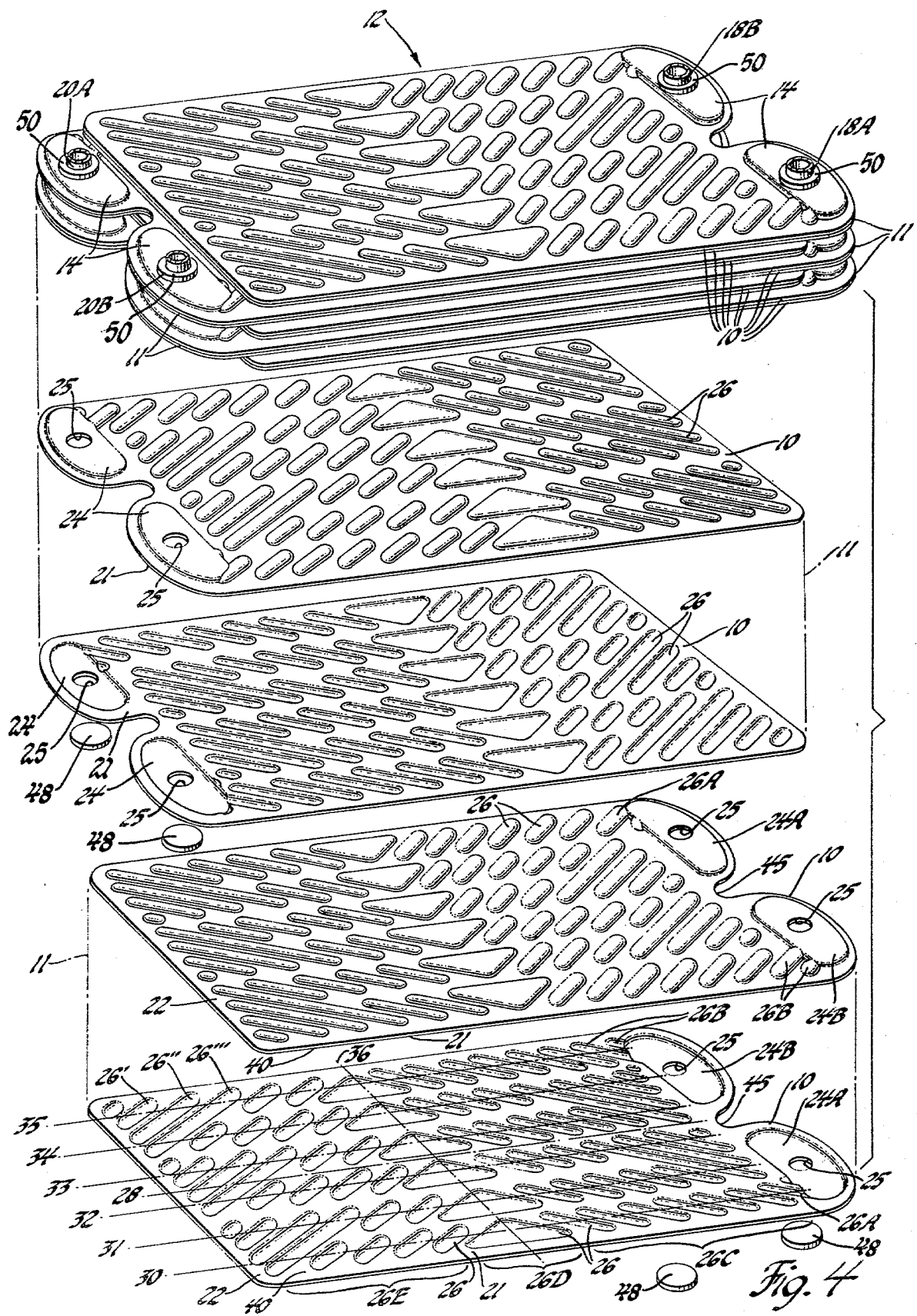
FIG. 4 is an exploded view of two pairs of the plates in the heat exchanger assembly in FIG. 1.

Describing now the plate formation, the heat transfer plates 10 have a uniform thickness and are preferrably stamped from sheet metal having a coating of brazing material 21 on only one side thereof, i.e. the dimpled side. But it will also be understood that they may also be formed of some other suitable material and bonded together in a manner best suited to the application as will be readily understood by those skilled in the art. As best seen in FIGS. 1, 2 and 4, the plates 10 are generally of rectangular shape and have a planar portion 22, a pair of protuberant manifolds portions 24 each with a central hole 25 and a series or column of protuberant channel portions 26. The manifold portions 24 and channel portions 26 all protrude from the non-brazable or non-sealed side of the planar portion 22 which may thus be referred to as the plate's protuberant side while the opposite side with the brazable coating is correspondingly referred to as the dimpled side. The protuberant manifold portions 24 are located side-by-side along one of the short sides of the plate and are symmetrical to a plane perpendicular to the planar portion 22 which bisects the plate's short sides, such plane intersecting the plate at a line 28 which extends parallel to the plate's long sides. The series of channel portions 26 loop back and forth between the short sides and along the long sides of the plate in an even number of parallel rows 30, 31, 32, 33, 34 and 35 which are divided by and are parallel to the bisecting line 28 of the plate's short sides. One or more channel portions 26A at one end of the series merges with one of the manifold portions 24A and one or more channel portions 26B at the other end of the series merges with the other manifold portion 24B. The series of channel portions 26 are divided into three distinct groups 26C, 26D and 26E extending across all the rows 30 through 35 with the group 26C including the channel portions 26A and 26B being located adjacent the manifold portions 24, the group 26E being remote therefrom adjacent the opposite short side of the plate, and the third group 26D being intermediate the other two groups. The intermediate group of channel portions 26D are all identical and have the shape in plain view of an isosceles triangle which is bisected by a plane that is perpendicular to the planar portion 22 and to the rows 30 through 35 in which one each of the channel portions 26D is disposed and intersects the plate at a line 36. The other two groups 26C and 26E have semispherical or semi-tubular cross-sections and are oriented at equal but opposite oblique angles to the rows 30 through 35 in which they are disposed and thus to the bisecting line 28 and also to the line of symmetry 35 of the other group of channel portions 26D. In addition, certain of the channel portions 26', 26" and 26''' in the groups 26C and 26E have progressively longer lengths to provide crossovers between adjoining ends of the rows 30 and 31, 31 and 32, 32 and 33, 33 and 34, and 34 and 35, adjacent the opposite short sided ends of the plate. Furthermore, the two groups of channel portions 26C and 26E have the same protuberance but the intermediate group of channel portions 26D have half such protuberance while the manifold portions 24 have a protuberance exceeding that of the channel portions 26C and 26E plus the thickness of one plate to provide uniform passage construction, nesting and tight clamping as will become more apparent from their assemblage.

Two of the plates 10 are thus arrangeable as a cooperating pair 11 as shown in FIGS. 1, 2 and 4 with their dimpled sides 40 facing each other so that their planar portions 22 sealingly abut to provide a brazable connection and seal therebetween while their respective manifold portions 24A and 24B align to cooperatively form the separate manifolds 14 with the holes 25 aligned for the tubes 18 or 20. In addition, the channel portions 26C and 26E in one plate cross with their counterparts in the other plate to interconnect as best seen in FIGS. 1, 2 and 4 while the intermediate channel portions 26D register but are 180° opposite each other to interconnect the crossed first and second groups 26C and 26E to thereby provide the fluid passage 16 connecting the manifolds 24 with a looped configuration which extends along the six parallel rows traveling back and forth between the plates.

Figure 3:
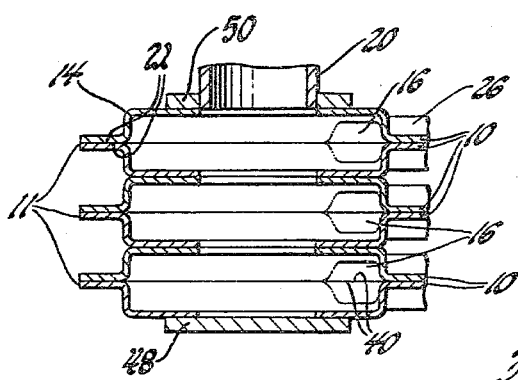
FIG. 3 is an enlarged view taken along the line 3—3 in FIG. 2.

With two pairs 11 of plates 10 thus arranged to each form a pair of manifolds 14 and connecting passage 16, these two pairs are then arrangeable to closely nest with each other by turning the two pairs 180° with respect to each other as shown in FIG. 4. In this position, the intermediate channel portions 26D are exactly alignable to abut with each other while the channel portions 26C on one of these plates nests alongside the channel portions 26E on the other of these plates and also against the planar portion 22 on the latter plate and vice versa. Thus, there is provided substantial surface-to-surface nesting contact between the two pairs of plates with the adjacent passage 16 in the two pairs of plates separated by the adjoining walls formed by the two nested plates. Using such stacking procedure, pairs of the plates may thus be arranged opposite each other in a stack as shown in FIG. 1 so that the manifolds formed by alternate pairs of plates abut with each other in the interior of the stack with their holes 25 in alignment to provide fluid passages therebetween as shown in FIG. 3. At each manifold stack, brazing material is provided at the joint between the abutting sides of the manifolds ringing their aligned holes 25 and the assembly of plates is then clamped together with a pair of rigid flanged backing plates 42 and 44 which are arranged on opposite sides of the stacked plates and are secured together by a pair of bolts 46 which pass through a valley 45 in the short side of the plates between the manifolds 14. As can best be seen in FIG. 1, the abutting relationship of the intermediate channel portions 26D together with the nesting of the channel portions 26C and 26E provides a ribbed network of the plates between the clamping plates 42 and 44 so that the clamping load applied thereby insures a tight fit of the planar portions 22 of the plates as well as tightly held nesting thereof.

To then complete the assembly, a disk 48 coated with brazing material is clamped over each of the lowermost holes 25 to close these holes while a ring 50 coated with brazing material is clamped about each of the uppermost holes 25. The header tubes 18 and 20 are then inserted through the rings 50 into the uppermost holes 25 and brazing material is applied to these joints. Heat is then applied to braze the parts together and thereby seal each pair of manifolds and connecting passages while the outer side of the latter is not so permanently joined to the side(s) of the adjacent passage(s) with which it nests. Instead, they remain in tight contact for good heat transfer without integral connection so as to provide a distinct double wall structure between the passages and also to provide channels between the planar portions of the plates through which any leakage from the passages can escape and be readily detected.

With the heat exchanger plates 10 thus stacked in pairs 11 and brazed, the two pairs of connected header pipes 18 and 20 may then be connected to the fluid sources to deliver two fluids to and from the heat exchanger. For example, in the case of a solar system, ethylene glycol can be delivered into the header pipe 18A and out the other header pipe 18B while potable water is delivered into the header pipe 20A and out the other header pipe 20B. With such connections, and as shown by solid line arrows for the water and dash line arrows for the ethylene glycol in FIG. 2, there is provided parallel flow between the different fluids in each pass but counterflow overall and with the heat transfer areas in each pass relatively small, the performance of the unit approximates that of a true counterflow heat exchanger with the same total heat transfer area.

Of course, it will be appreciated by those skilled in the art that the plates may be formed to provide any even number of passes less than or greater than six and still enable the plates to be made with single tooling and with the manifolds or headers for the alternate and separate passages at opposite ends of the heat exchanger. Furthermore, while seven pairs of plates have been shown in the assembly, it is also obvious that a smaller number such as two pairs of plates or more than four may be so arranged with the separate passages still separate by an adjoining pair of walls. Furthermore, the plates need not have rectangular configurations and instead may be square or curved so long as the similarity and symmetry of the manifold portions and the passage forming portions are retained such that when their dimpled sides face each other they cooperate to form the manifolds and connected passage and when oppositely arranged with their protuberance sides facing each other they are then nestable.

The above described preferred embodiments are illustrative of the invention which may be modified within the scope of the appended claims.

The embodiments of the invention in which an exclusive property or privilege is claimed are defined as follows:

1. A plate of uniform thickness arrangeable with plates of like kind to form a heat exchanger having passages for two fluids separated by an adjoining pair of walls, said plate comprising a planar portion, a series of protuberant channel portions protruding in the same direction from said planar portion, said series including at least two parallel rows extending across the plate, said series divided into three groups extending across said rows comprising first and second groups at opposite end portions of the rows and a third group intermediate said first and second groups, the channel portions in said first and second groups oriented at opposite oblique angles to said rows, and the channel portions in said third group having sides oriented at opposite oblique angles to said rows and having less protuberance than the channel portions in said first and second groups whereby a pair of the plates are arrangeable with their dimple sides facing each other so that their planar portions sealingly abut and the channel portions in their first group cross to interconnect and also the channel portions in their second group cross to interconnect while the channel portions in their third group register to connect the first and second groups to thereby form a sealed fluid passage between the plates and whereby a plurality of pairs of the sealingly abutting plates are also arrangeable in adjoining relationship with their protuberant sides facing each other so that two pairs of sealingly abutting plates have the channel portions in their third group abutting while the channel portions in their first and second groups nest along side each other and abut the opposite planar portion to thereby provide substantial surface-to-surface contact between the pairs of sealingly abutting plates and to form therewith separate fluid passages for two fluids which are separated by two of the plates.

2. A plate of uniform thickness arrangeable with plates of like kind to form a heat exchanger having passages for two fluids separated by an adjoining pair of walls, said plate comprising a planar portion, a pair of protuberant manifold portions protruding in the same direction from and separated from each other by said planar portion, a series of protuberant channel portions protruding in the same direction as said manifold portions from said planar portion, said series extending between said manifold portions and including at least two parallel rows with the channel portion at one end of the series merging with one of the manifold portions and the channel portion at the other end of the series merging with the other manifold portion, said series divided into three groups extending across said rows comprising a first group adjacent said manifold portions and a second group remote therefrom and a third group intermediate said first and second groups, the channel portions in said first and second groups oriented at opposite oblique angles to said rows, and the channel portions in said third group having sides oriented at opposite oblique angles to said rows and having less protuberance than the channel portions in said first and second groups whereby a pair of the plates are arrangeable with their dimple sides facing each other so that their planar portions sealingly abut and their manifold portions align with each other and the channel portions in their first group cross to interconnect and also the channel portions in their second group cross to interconnect while the channel portions in their third group register to connect the first and second groups to thereby form a pair of sealed manifolds and connecting sealed fluid passage between the plates and whereby a plurality of pairs of the sealingly abutting plates are also arrangeable in adjoining relationship with their protuberant sides facing each other so that two pairs of sealingly abutting plates have the channel portions in their third group abutting while the channel portions in their first and second groups nest along side each other and abut the opposite planar portion to thereby provide substantial surface-to-surface contact between the pairs of sealingly abutting plates and to form therewith separate fluid passages for two fluids which are separated by two of the plates.

3. A plate of uniform thickness arrangeable with plates of like kind to form a heat exchanger having passages for two fluids separated by an adjoining pair of walls, said plate comprising a planar portion, a pair of protuberant manifold portions located side-by-side and protruding equal distances in the same direction from and separated from each other by said planar portion, a series of protuberant channel portions located side-by-side and protruding in the same direction as said manifold portions from and separated from each other by said planar portion, said series extending between said manifold portions and including at least two parallel rows with the channel portion at one end of the series merging with one of the manifold portions and the channel portion at the other end of the series merging with the other manifold portion, said series divided into three groups extending across said rows comprising a first group adjacent said manifold portions and a second group remote therefrom and a third group intermediate said first and second groups, the channel portions in said first and second groups oriented at equal but opposite oblique angles to said rows and having the same protuberance which is less than that of said manifold portions by the thickness of the plate, and the channel portions in said third group having sides oriented at the opposite oblique angles to said rows and having half the protuberance of said manifold portions whereby a pair of the plates are arrangeable with their dimple sides facing each other so that their planar portions sealingly abut and their manifold portions align with each other and the channel portions in their first group cross to interconnect and also the channel portions in their second group cross to interconnect while the channel portions in their third group register to connect the first and second groups to thereby form a pair of sealed manifolds and connecting sealed fluid passage between the plates and whereby a plurality of pairs of the sealingly abutting plates are also arrangeable in adjoining relationship with their protuberant sides facing each other so that two pairs of sealingly abutting plates have the channel portions in their third group abutting while the channel portions in their first and second groups nest along side each other and abut the opposite planar portion and at least one of their manifold portions abuts the manifold portion of a similarly arranged other pair of sealingly abutting plates to thereby provide substantial surface-to-surface contact between the pairs of sealingly abutting plates and to form therewith separate fluid passages for two fluids which are separated by two of the plates.

* * * * *